United States Patent
Il et al.

(10) Patent No.: US 9,102,322 B2
(45) Date of Patent: Aug. 11, 2015

(54) CONTROL APPARATUS FOR HYBRID VEHICLE

(75) Inventors: Ryoki Il, Toyota (JP); Akihiro Sato, Nagoya (JP); Norihiro Yamamura, Miyoshi (JP); Akiko Nishimine, Toyota (JP); Tomoyuki Maruyama, Tajimi (JP); Takeshi Miyagawa, Toyokawa (JP); Tomoaki Furukawa, Toyota (JP); Takeshi Kanayama, Toyota (JP); Tetsuo Hori, Toyota (JP); Koji Hayashi, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 91 days.

(21) Appl. No.: 13/882,829

(22) PCT Filed: Nov. 4, 2010

(86) PCT No.: PCT/JP2010/069587
§ 371 (c)(1), (2), (4) Date: May 29, 2013

(87) PCT Pub. No.: WO2012/059999
PCT Pub. Date: May 10, 2012

(65) Prior Publication Data
US 2013/0253743 A1    Sep. 26, 2013

(51) Int. Cl.
*B60L 9/00*        (2006.01)
*B60L 11/00*       (2006.01)
(Continued)

(52) U.S. Cl.
CPC ............... *B60W 20/20* (2013.01); *B60K 6/445* (2013.01); *B60W 10/02* (2013.01); *B60W 10/06* (2013.01);
(Continued)

(58) Field of Classification Search
CPC ..... B60W 10/02; B60W 10/06; B60W 10/08; B60W 20/20; B60W 20/40; B60W 20/00; B60W 2600/00; B60W 50/082; B60W 50/10; B60W 2540/10; B60K 6/445; Y10S 903/93; Y02T 10/6239
USPC ........................................................... 701/22
See application file for complete search history.

(56) References Cited

U.S. PATENT DOCUMENTS 7,597,164 B2 * 10/2009 Severinsky et al. ......... 180/65.27
7,678,005 B2 * 3/2010 Tuckfield ...................... 475/131
(Continued)

FOREIGN PATENT DOCUMENTS

CN         101209667 A      7/2008
JP         A-2002-271909    9/2002
(Continued)

*Primary Examiner* — Calvin Cheung
*Assistant Examiner* — Paula L Schneider
(74) *Attorney, Agent, or Firm* — Oliff PLC

(57) ABSTRACT

A vehicle control apparatus configured to selectively establish one of a first drive state in which a vehicle drive force is generated primarily by a second motor/generator operated with an electric energy supplied from an electric-energy storage device while an engine is placed in a rest state, and a second drive state in which a first motor/generator is operated with a drive force of the engine, to generate an electric energy and in which the vehicle drive force is generated primarily by the second motor/generator operated with at least the electric energy generated by the first motor/generator. The vehicle control apparatus is further configured such that the vehicle drive force generated in the second drive state at a given value of an accelerator pedal operation amount θacc is larger than that generated in the first drive state.

5 Claims, 11 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 20/00* (2006.01)
*B60K 6/445* (2007.10)
*B60W 10/02* (2006.01)
*B60W 10/06* (2006.01)
*B60W 10/08* (2006.01)
*B60W 50/08* (2012.01)
*B60W 50/10* (2012.01)

(52) U.S. Cl.
CPC ............... *B60W 10/08* (2013.01); *B60W 20/00* (2013.01); *B60W 20/40* (2013.01); *B60W 50/082* (2013.01); *B60W 50/10* (2013.01); *B60W 2540/10* (2013.01); *B60W 2600/00* (2013.01); *Y02T 10/6239* (2013.01); *Y10S 903/93* (2013.01)

(56) References Cited

U.S. PATENT DOCUMENTS

| | | | |
|---|---|---|---|
| 7,869,926 B2* | 1/2011 | Tuckfield et al. | 701/56 |
| 7,921,943 B2* | 4/2011 | Ueoka et al. | 180/65.21 |
| 8,138,720 B2* | 3/2012 | Snyder et al. | 320/127 |
| 2003/0094816 A1 | 5/2003 | Kazama | |
| 2004/0134698 A1 | 7/2004 | Yamamoto et al. | |
| 2006/0048516 A1* | 3/2006 | Tenbrock et al. | 60/698 |
| 2008/0146407 A1* | 6/2008 | Tuckfield | 477/34 |
| 2008/0173485 A1 | 7/2008 | Kumazaki et al. | |
| 2008/0300768 A1* | 12/2008 | Hijikata | 701/102 |
| 2009/0112439 A1* | 4/2009 | Kuang et al. | 701/99 |
| 2011/0120788 A1 | 5/2011 | Wang et al. | |

FOREIGN PATENT DOCUMENTS

| | | |
|---|---|---|
| JP | A-2004-208477 | 7/2004 |
| JP | A-2007-168551 | 7/2007 |
| JP | A-2008-174159 | 7/2008 |
| JP | A-2009-292319 | 12/2009 |
| JP | A-2010-173388 | 8/2010 |

* cited by examiner

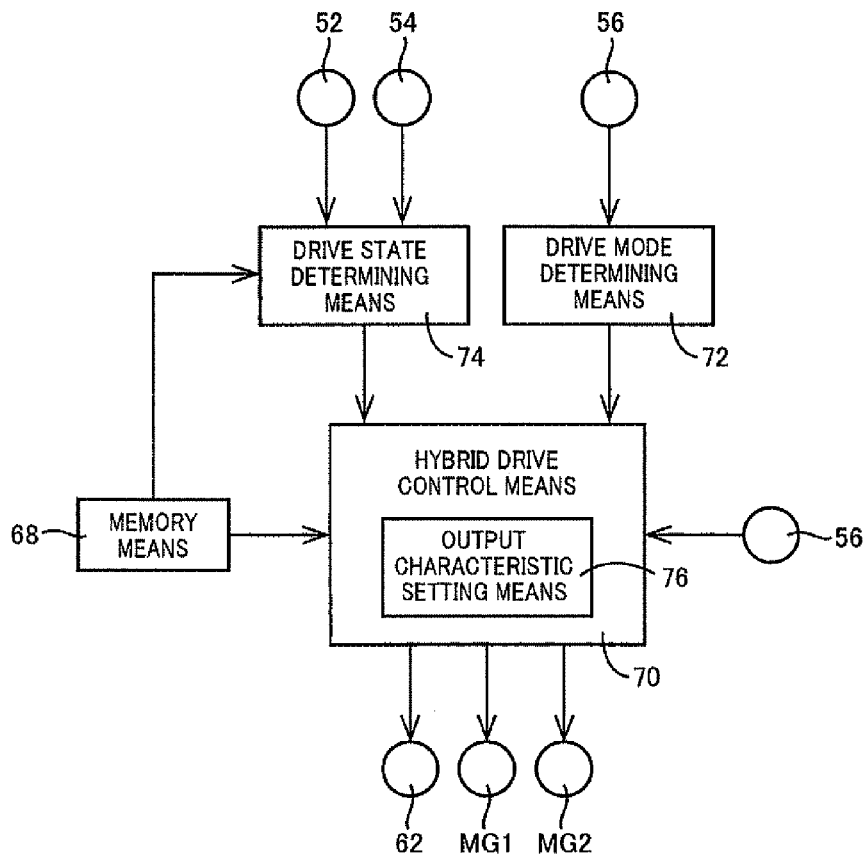

|  |  | ENGINE 12 | MG1 | MG2 | STARTING CLUTCH 26 |
|---|---|---|---|---|---|
| EV |  | REST STATE | FREE STATE | VEHICLE DRIVING STATE | POWER CUT-OFF STATE |
| SERIES HEV |  | OPERATED STATE | ELECTRICITY GENERATING STATE | VEHICLE DRIVING STATE | POWER CUT-OFF STATE |
| PARALLEL HEV | a | OPERATED STATE | VEHICLE DRIVING STATE | FREE STATE | POWER TRANSMITTING STATE |
|  | b | OPERATED STATE | ELECTRICITY GENERATING STATE | VEHICLE DRIVING STATE | POWER TRANSMITTING STATE |
|  | c | OPERATED STATE | FREE STATE | FREE STATE | POWER TRANSMITTING STATE |
| DECELERATING RUN |  | REST STATE | FREE STATE | ELECTRICITY GENERATING STATE | POWER CUT-OFF STATE |

FIG.11

|  | ECONOMY DRIVE MODE | NORMAL DRIVE MODE | SPORTY DRIVE MODE |
|---|---|---|---|
| VEHICLE RUN WITHOUT OPERATION OF ENGINE | A | B | C |
| VEHICLE RUN WITH OPERATION OF ENGINE | B | C | D |

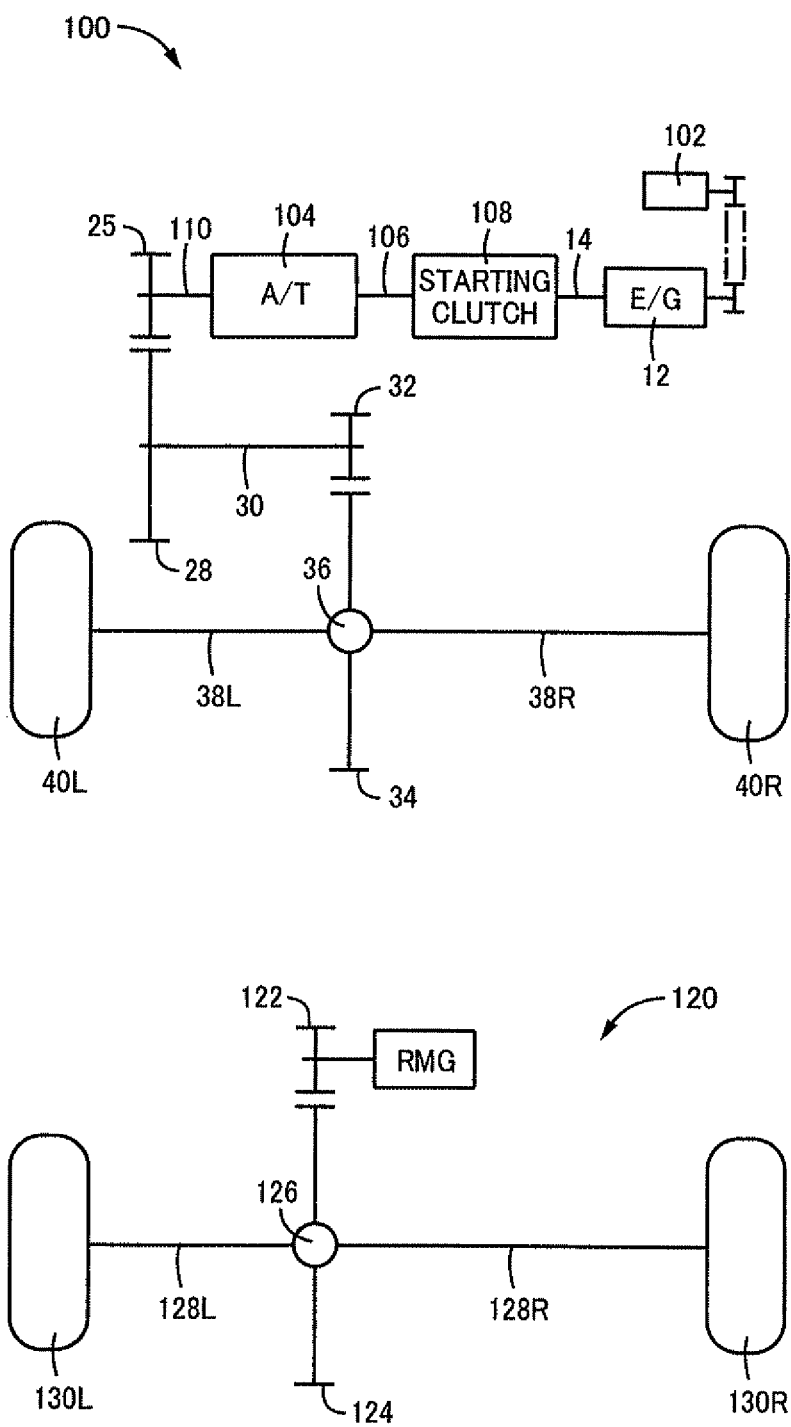

FIG.14(a)
CONSTRUCTION

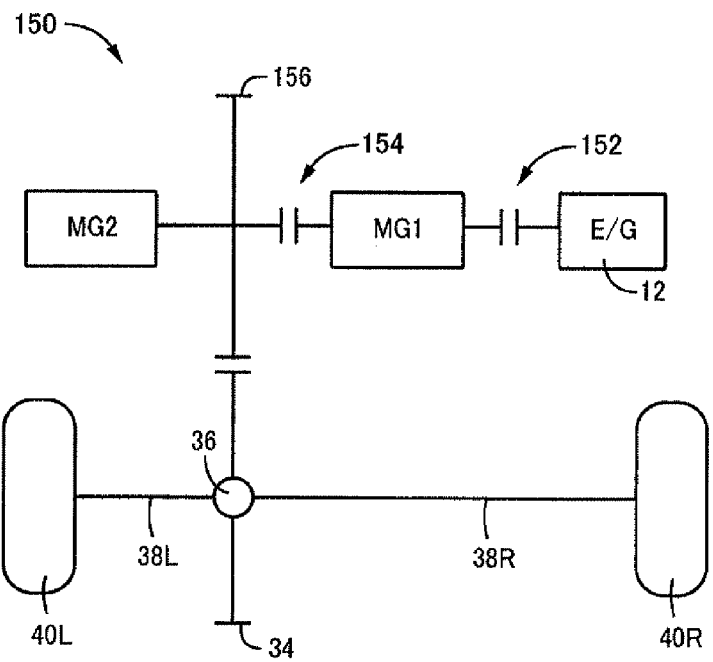

FIG.14(b)
DRIVE STATE

|  |  | ENGINE 12 | MG1 | MG2 | FIRST CLUTCH 152 | SECOND CLUTCH 154 |
|---|---|---|---|---|---|---|
| EV |  | REST STATE | FREE STATE | VEHICLE DRIVING STATE | POWER CUT-OFF STATE | POWER CUT-OFF STATE |
| SERIES HEV |  | OPERATED STATE | ELECTRICITY GENERATING STATE | VEHICLE DRIVING STATE | POWER TRANSMITTING STATE | POWER CUT-OFF STATE |
| PARALLEL HEV | a | OPERATED STATE | VEHICLE DRIVING STATE | FREE STATE | POWER TRANSMITTING STATE | POWER TRANSMITTING STATE |
|  | b | OPERATED STATE | ELECTRICITY GENERATING STATE | VEHICLE DRIVING STATE | POWER TRANSMITTING STATE | POWER TRANSMITTING STATE |
|  | c | OPERATED STATE | FREE STATE | FREE STATE | POWER TRANSMITTING STATE | POWER TRANSMITTING STATE |
| DECELERATING RUN |  | REST STATE | FREE STATE | ELECTRICITY GENERATING STATE | POWER CUT-OFF STATE | POWER CUT-OFF STATE |

CONSTRUCTION

FIG.15(b)

DRIVE STATE

| | | ENGINE 12 | MG1 | MG2 | FIRST CLUTCH 166 | SECOND CLUTCH 168 | BRAKE 170 |
|---|---|---|---|---|---|---|---|
| EV | | REST STATE | FREE STATE | VEHICLE DRIVING STATE | POWER CUT-OFF STATE | POWER CUT-OFF STATE | ENGAGED |
| SERIES HEV | | OPERATED STATE | ELECTRICITY GENERATING STATE | VEHICLE DRIVING STATE | POWER TRANSMITTING STATE | POWER CUT-OFF STATE | ENGAGED |
| PARALLEL HEV | a | OPERATED STATE | FREE STATE | VEHICLE DRIVING STATE | POWER TRANSMITTING STATE | POWER TRANSMITTING STATE | RELEASED |
| | b | OPERATED STATE | ELECTRICITY GENERATING STATE | VEHICLE DRIVING STATE | POWER TRANSMITTING STATE | POWER TRANSMITTING STATE | RELEASED |
| DECELERATING RUN | | REST STATE | FREE STATE | ELECTRICITY GENERATING STATE | POWER CUT-OFF STATE | POWER CUT-OFF STATE | ENGAGED |

CONTROL APPARATUS FOR HYBRID VEHICLE

TECHNICAL FIELD

The present invention relates to a control apparatus for a hybrid vehicle, and more particularly to an improvement of the control apparatus, which permits a higher degree of drivability of the hybrid vehicle depending upon whether an engine is in an operated state or not.

BACKGROUND ART

There is known a hybrid vehicle provided with an engine, a first electric motor connected to the engine, a second electric motor connected to wheels, and an electric-energy storage device for supplying an electric energy to the above-indicated first and second electric motors. For such a hybrid vehicle, there has been proposed a control technique for changing output characteristics of a vehicle drive force corresponding to an operation amount of an accelerator pedal, depending upon a running state of the hybrid vehicle. Patent Document 1 discloses an example of a control apparatus for the hybrid vehicle. This control apparatus is configured to selectively establish one of a first drive state in which the vehicle drive force is generated by only the electric motor, and a second drive state in which the vehicle drive force is generated by both the electric motor and the engine. The output characteristics in the first and second drive states are changed such that the vehicle drive force generated for an operating amount of the accelerator pedal in the second drive state is larger than that generated for the operating amount in the first drive state, so that starting of the engine can be effectively restricted according to a requirement for driving the vehicle with the electric motor.

PRIOR ART DOCUMENTS

Patent Documents

Patent Document 1: JP-A-2008-174159
Patent Document 2: JP-A-2010-173388
Patent Document 3: JP-A-2004-208477

SUMMARY OF THE INVENTION

Object Achieved by the Invention

By the way, one type of the known hybrid vehicle described above is arranged to establish a drive state in which the above-described first electric motor is operated with a drive force of the above-described engine, to generate an electric energy and in which the vehicle drive force is generated primarily by the above-described second electric motor operated with the electric energy generated by said first electric motor. In this drive state, an output of the above-described engine in the operated state is used primarily for operating the above-described first electric motor to generate the electric energy, but is not used as the vehicle drive force. According to the prior art technique described above, the vehicle drive force corresponding to the operation amount of the accelerator pedal, which is generated in the above-indicated drive state that is similar to the drive state in which the vehicle drive force is generated by only the electric motor, is controlled to be comparatively smaller than that generated in the drive state in which the vehicle drive force is generated by both the electric motor and the engine. However, the vehicle operator hearing an operating sound of the engine psychologically tends to expect a sporty running of the vehicle with a higher degree of acceleration with the engine in the operating state, than in the drive state in which the vehicle drive force is generated by only the electric motor. Therefore, the vehicle operator expecting the sporty running of the vehicle as a result of starting of the engine may be dissatisfied with the actual output characteristics of the vehicle which are identical with those in the drive state in which the vehicle drive force is generated by only the electric motor. In this respect, there has been a need of developing a control apparatus for a hybrid vehicle, which permits a higher degree of drivability of the hybrid vehicle depending upon whether the engine is in the operated state or not.

The present invention was made in view of the background art described above. It is therefore an object of the present invention to provide a control apparatus for a hybrid vehicle, which permits a higher degree of drivability of the hybrid vehicle depending upon whether the engine is in the operated state or not.

Means for Achieving the Object

The object indicated above is achieved according to the present invention, which provides a control apparatus for a hybrid vehicle provided with an engine, a first electric motor connected to the above-described engine, a second electric motor connected to wheels of the hybrid vehicle, and an electric-energy storage device for supplying an electric energy to the above-described first and second electric motors, the above-described control apparatus being configured to selectively establish one of a first drive state in which a vehicle drive force is generated primarily by the above-described second electric motor operated with the electric energy supplied from the above-described electric-energy storage device while the above-described engine is placed in a rest state, and a second drive state in which the above-described first electric motor is operated with a drive force of the above-described engine, to generate an electric energy and in which the vehicle drive force is generated primarily by the above-described second electric motor operated with at least one of the electric energy generated by the above-described first electric motor and the electric energy supplied from the above-described electric-energy storage device, the above-described control apparatus being characterized by controlling the hybrid vehicle such that the vehicle drive force generated in the above-described second drive state at a given value of an operation amount of an accelerator pedal is larger than that generated in the above-described first drive state.

Advantages of the Invention

The present control apparatus is configured to selectively establish one of the first drive state in which the vehicle drive force is generated primarily by the above-described second electric motor operated with the electric energy supplied from the above-described electric-energy storage device while the above-described engine is placed in the rest state, and the second drive state in which the above-described first electric motor is operated with the drive force of the above-described engine, to generate an electric energy and in which the vehicle drive force is generated primarily by the above-described second electric motor operated with at least one of the electric energy generated by the above-described first electric motor and the electric energy supplied from the above-described electric-energy storage device. The present embodiment is further configured such that the vehicle drive force generated in the above-indicated second drive state at a given value of the accelerator pedal operation amount is larger than that generated in the above-indicated first drive state. Thus, the output characteristic is set such that the vehicle drive force generated primarily by the electric motor in the drive state in which the engine is placed in the operated state is larger than that generated in the drive state in which the vehicle drive force is generated by only the electric motor, so that the vehicle operator hearing an operating sound of the engine can feel drivability of the hybrid vehicle as expected from the operating sound. Namely, the control apparatus permits a higher degree of drivability of the hybrid vehicle depending upon whether the engine is in the operated state or not.

In the above-described second drive state, the above-described first electric motor is operated with the drive force of the above-described engine, to generate an electric energy, which can be supplied to the above-described second electric motor, so that the second electric motor can be operated with the electric energy generated by the above-described first electric motor as well as the electric energy stored in the above-described electric-energy storage device, even where the amount of an electric energy that can be used by the above-described second electric motor is limited due to limitation of the amount of an electric energy to be supplied from the above-described electric-energy storage device at a low temperature or under any other operating environments. Namely, even where the output of the above-described second electric motor is limited due to limitation of the output of the above-described electric-energy storage device, the output characteristic of the vehicle is set such that the vehicle drive force generated at a given value of the accelerator pedal operation amount in the above-described second drive state is larger than that generated in the above-described first drive state, so that the above-described second electric motor can be used as the vehicle drive power source so as to meet a requirement by the vehicle operator, under a wider variety of operating environments. If the output characteristic is not set in the above-described manner, the vehicle is brought into an engine drive state in which only the above-described engine is operated as the vehicle drive power source, where the amount of the electric energy to be supplied from the above-described electric-energy storage device is limited at a low temperature or under any other operating environments. In this case, the engine can not be operated with a high degree of efficiency, giving rise to a risk of deterioration of the fuel economy of the vehicle.

In a preferred form of this invention, the control apparatus is configured to selectively establish one of the above-described first drive state, the above-described second drive state, and a third drive state in which the vehicle drive force is generated by the above-described engine and the above-described first electric motor operated with the electric energy supplied from the above-described electric-energy storage device, and to control the hybrid vehicle such that the vehicle drive force generated in the above-described third drive state at a given value of the operation amount of the accelerator pedal is equal to that generated in the above-described second drive state. In this preferred form of the invention, the output characteristic is set such that the vehicle drive force generated in the drive state in which the vehicle drive force is generated by the above-described engine and first electric motor is larger than that generated in the drive state in which the vehicle drive force is generated by only the above-described second electric motor, so that the vehicle operator hearing the operating sound of the engine can feel drivability of the hybrid vehicle as expected from the operating sound.

In another preferred form of the invention, the control apparatus is configured to selectively establish one of the above-described first drive state, the above-described second drive state, and a third drive state in which the vehicle drive force is generated by the above-described engine and the above-described first electric motor operated with the electric energy supplied from the above-described electric-energy storage device, and to control the hybrid vehicle such that the vehicle drive force generated in the above-described third drive state at a given value of the operation amount of the accelerator pedal is larger than that generated in the above-described second drive state. In this preferred form of the invention, the output characteristic is set such that the vehicle drive force generated in the drive state in which the vehicle drive force is generated by the above-described engine and first electric motor is larger than that generated in the drive state in which the vehicle drive force is generated by only the above-described second electric motor, and is further larger than that generated in the drive state in which the above-described engine is operated primarily to generate an electric energy, so that the vehicle operator hearing the operating sound of the engine can feel drivability of the hybrid vehicle as expected from the operating sound.

In a further preferred form of the invention, the control apparatus is configured to selectively establish one of an economy drive mode, a normal drive mode and a sporty drive mode, according to an operation by an operator of the hybrid vehicle, and to control the hybrid vehicle such that the vehicle drive force generated in the above-described normal drive mode at a given value of the operation amount of the accelerator pedal is larger than that generated in the above-described economy drive mode, and such that the vehicle drive force generated in the above-described sporty drive mode at a given value of the operation amount of the accelerator pedal is larger than that generated in the above-described normal drive mode. In this preferred form of the invention, the output characteristic for the vehicle drive force is set differently depending upon one of the drive modes established according to the operation by the operator of the hybrid vehicle, and such that the vehicle drive force generated primarily by the electric motor in each of the drive modes and in the drive state in which the engine is placed in the operated state is larger than that generated in the drive state in which the vehicle drive force is generated by only the electric motor, so that the running of the hybrid vehicle can be intricately controlled as intended by the operator of the hybrid vehicle.

In a still further preferred form of the invention, the control apparatus is configured such that when the drive mode is changed from the presently established one of the above-described economy, normal and sporty drive modes to another according to the operation of the operator of the hybrid vehicle, the output characteristic of the hybrid vehicle corresponding to the value of the operation amount of the accelerator pedal is changed when the operation amount of the accelerator pedal has been reduced to or below a predetermined value. In this preferred form of the invention, it is possible to effectively prevent deterioration of the drivability of the hybrid vehicle due to a change of the output characteristic of the vehicle drive force immediately after the operation of the operator of the hybrid vehicle to change the drive mode.

BRIEF DESCRIPTION OF THE DRAWINGS

FIG. 5 is a functional block diagram for explaining major control functions of the electronic control device of FIG. 3;

FIG. 6 is a view for explaining a plurality of drive states to be selectively established in the drive system of the hybrid vehicle of FIG. 1;

FIG. 11 is a table indicating the output characteristic maps of FIG. 10 to be selected depending on the drive state and drive mode of the hybrid vehicle of FIG. 1;

FIG. 13 is a schematic view showing an arrangement of a drive system of another hybrid vehicle to which the present invention is suitably applicable;

FIG. 14 are views for explaining a drive system of a further hybrid vehicle to which the present invention is suitably applicable, FIG. 14(a) being a schematic view showing an arrangement of the drive system, while FIG. 14(b) being a view for explaining a plurality of drive states to be selectively established in the hybrid vehicle.

MODE FOR CARRYING OUT THE INVENTION

Preferred embodiments of the present invention will be described in detail by reference to the drawings.

Embodiments

Figure 1:
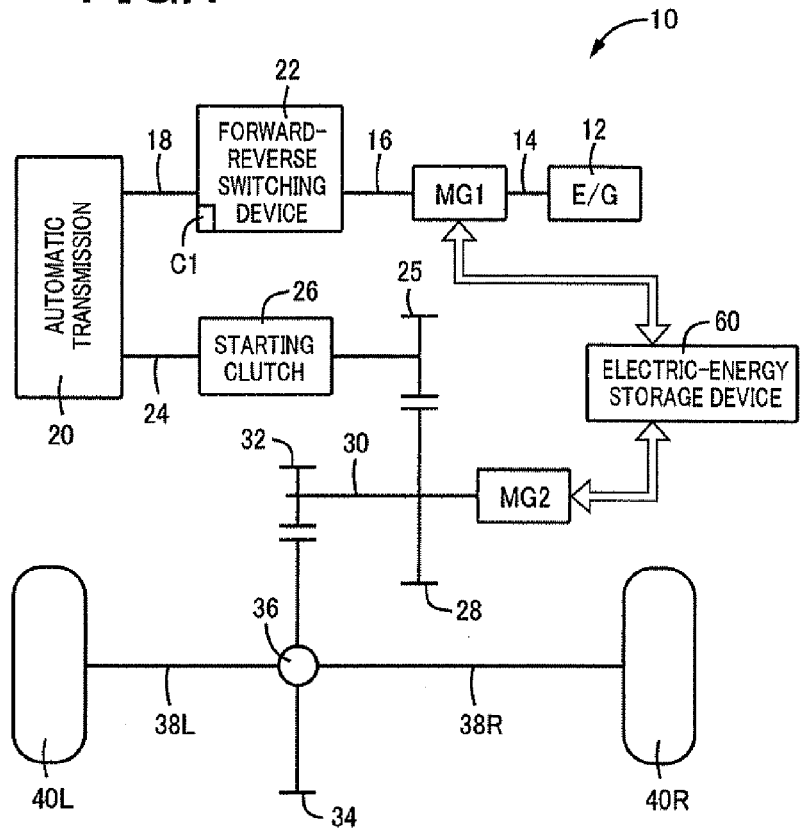
FIG. 1 is a schematic view shown an arrangement of a drive system provided on a hybrid vehicle to which the present invention is suitably applicable.

FIG. 1 is the schematic view shown the arrangement of a drive system provided on a hybrid vehicle 10 to which the present invention is suitably applicable. As shown in FIG. 1, the hybrid vehicle 10 according to the present invention is provided with: an engine 12; a first motor/generator MG1 connected to a crankshaft 14 of the engine 12; a forward-reverse switching device 22 connected to the first motor/generator MG1 through an intermediate shaft 16 and to an automatic transmission 20 through an input shaft 18; a starting clutch 26 interposed between an output shaft 24 of the automatic transmission 20 and a first gear 25 and configured to selectively place a power transmitting path therebetween in a power transmitting state and a power cut-off state; a counter shaft 30 on which a second gear 28 meshing with the first gear 25 is mounted; a second motor/generator MG2 connected to the counter shaft 30; a third gear 32 mounted on the counter shaft 30; a differential gear device 36 provided with a fourth gear 34 meshing with the third gear 32; and left and right front drive wheels 40L and 40R connected to the differential gear device 36 through respective left and right axles 38L and 38R. The engine 12 is an internal combustion engine constructed to generate a drive force by combustion of a fuel, while the first motor/generator MG1 and the second motor/generator MG2 can be used as electric motors and electric generators. In the present embodiment, the first motor/generator MG1 functions as a first electric motor operatively connected directly or indirectly to the crankshaft 14 of the above-indicated engine 12, while the second motor/generator MG2 functions as a second electric motor operatively connected directly or indirectly to the above-indicated left and right front drive wheels 40L, 40R.

Figure 2:
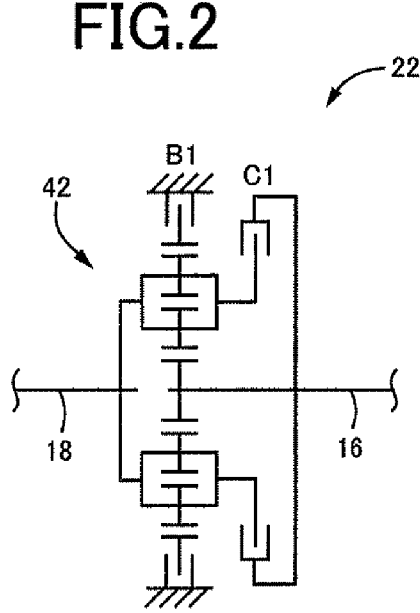
FIG. 2 is a schematic view for explaining an arrangement of a forward-reverse switching device provided in the drive system of the hybrid vehicle of FIG. 1.

As shown in FIG. 2, the above-indicated forward-reverse switching device 22 is provided with a planetary gear set 42 of a double-pinion type, a forward drive clutch C1 and a reverse drive brake B1, for example. Described more specifically, the planetary gear set 42 has a sun gear connected to the intermediate shaft 16, a carrier connected to the input shaft 18 and selectively connected to the intermediate shaft 16 through the forward drive clutch C1, and a ring gear selectively brought into a locked state through the reverse drive brake B1. When the forward drive clutch C1 and the reverse drive brake B1 are both placed in their released state, a power transmitting path between the intermediate shaft 16 and the input shaft 18 is placed in a power cut-off state. When the forward drive clutch C1 is placed in its engaged state while the reverse drive brake B1 is placed in its released state, the forward-reverse switching device 22 is placed in a forward driving state in which a rotary motion of the intermediate shaft 16 is transmitted to the input shaft 18, without reversal of the direction of rotation. When the forward drive clutch C1 is placed in its released state while the reverse drive brake B1 is placed in its engaged state, the forward-reverse switching device 22 is placed in a reverse driving state in which the rotary motion of the intermediate shaft 16 is transmitted to the input shaft 18 such that the direction of rotation of the input shaft 18 is reversed with respect to that of the intermediate shaft 16. For instance, the forward drive clutch C1 and the reverse drive brake B1 are constituted by hydraulically operated frictional coupling devices. It is noted that the forward-reverse switching device 22 may be otherwise constructed, for example, may be provided with a planetary gear set of a single-pinion type.

The automatic transmission 20 according to the present embodiment is a belt-type continuously-variable transmission provided with an input pulley and an output pulley. The input pulley is disposed coaxially with the above-described engine 12, first motor/generator MG1 and forward-reverse switching device 22, while the output pulley is disposed coaxially with the above-described starting clutch 26 and first gear 25. The above-described starting clutch 26 is a hydraulically operated frictional coupling device, and functions as a connecting/disconnecting device interposed between the output shaft 24 and the first gear 25 and configured to be switched between a power transmitting state and a power cut-off state. It is noted that the forward-reverse switching device 22 may be modified so as to have a neutral state, namely, a power cut-off state, so that the forward-reverse switching device 22 is also operable as the above-indicated connecting/disconnecting device.

Figure 3:
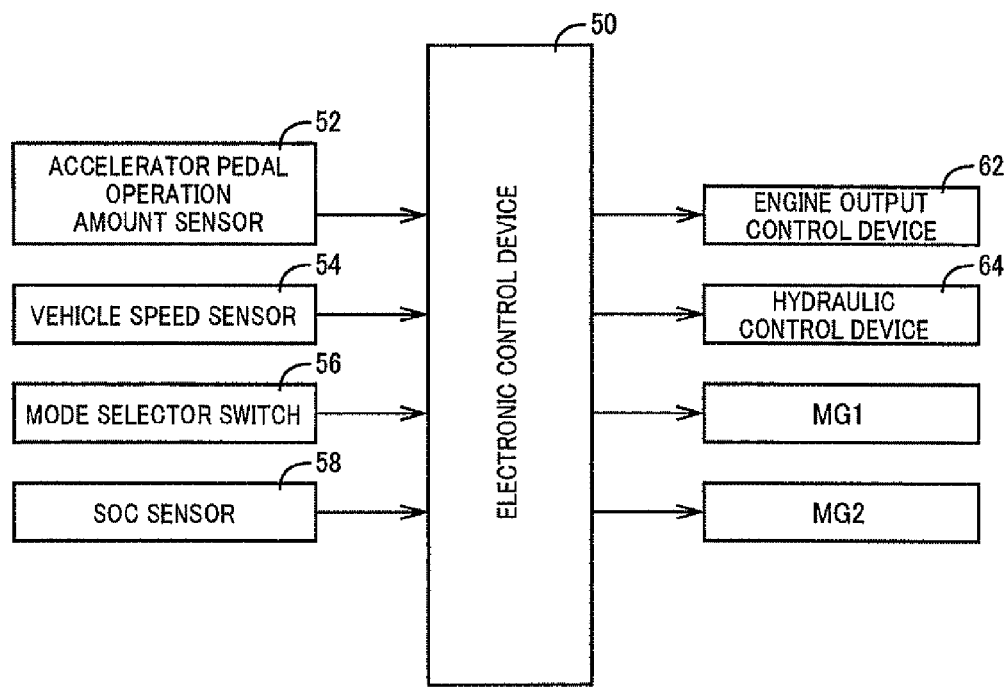
FIG. 3 is a view for explaining an electronic control device and various components of an electric system provided in the drive system of the hybrid vehicle of FIG. 1.

The hybrid vehicle 10 constructed as described above is provided with an electronic control device 50 configured to implement a hybrid control for running the hybrid vehicle 10 in a selected one of a plurality of drive states with a selected one of combinations of the drive power sources, and a shifting control of the above-described automatic transmission 20. FIG. 3 is the view for explaining the electronic control device 50. This electronic control device 50 includes a microcomputer configured to perform signal processing operations according to programs stored in a ROM while utilizing a temporary data storage function of a RAM. The electronic control device 50 receives an output signal of an accelerator pedal operation amount sensor 52 indicative of an operation amount θacc of an accelerator pedal, an output signal of a vehicle speed sensor 54 indicative of a vehicle running speed V, an output signal of a mode selector switch 56 indicative of a selected vehicle drive mode, and an output signal of an SOC sensor 58 indicative of an electric energy amount SOC stored in an electric-energy storage device 60 (battery) which is an electric power source for the first motor/generator MG1 and second motor/generator MG2. The electronic control device 50 receives various other kinds of information such as operating speeds of the engine 12, first motor/generator MG1 and second motor/generator MG2 which are detected by respective speed sensors.

Figure 4:
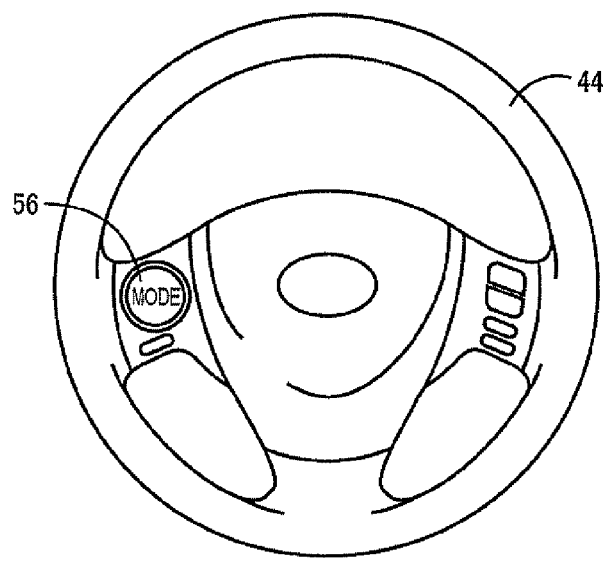
FIG. 4 is a view illustrating an example of a mode selector switch provided in the drive system of the hybrid vehicle of FIG. 1.

FIG. 4 is the view illustrating an example of the mode selector switch 56. As shown in FIG. 4, the mode selector switch 56 is a manually operable mode selecting member provided on a steering wheel 44 or an instrumental panel, for example, to select one of (a) an economy drive mode for vehicle running with improved fuel economy, (b) a normal drive mode for normal vehicle running, and (c) a sporty drive mode for vehicle running with a high degree of drivability. The vehicle operator can select a desired one of the economy, normal and sporty drive modes by pressing the mode selector switch 56. However, the mode selector switch 56 may be replaced by two mode selector pushbuttons which are pressed to select the respective economy drive mode and sporty drive mode. In this case, the normal drive mode is selected while none of the two mode selector pushbuttons are pressed. The above-described automatic transmission 20 is shifted according to predetermined different shifting conditions corresponding to the respective economy, normal and sporty drive modes, for example, according to a sporty drive shifting pattern for maintaining its input speed at a comparatively high target value (for selecting a comparatively low gear position) for a given value of the vehicle running speed V, or an economy drive shifting pattern for maintaining its input speed at a comparatively low target value (for selecting a comparatively high gear position) for the given value of the vehicle running speed V. The electric energy amount SOC is obtained by calculating from time to time amounts of charging and discharging of the electric-energy storage device, for instance.

The above-described electronic control device 50 generates control commands to be applied to various portions of the above-described hybrid vehicle 10. Namely, the hybrid vehicle 10 is provided with an engine output control device 62 configured to control an output of the above-described engine 12, by implementing a fuel supply control for controlling a fuel injecting device to inject a fuel into an intake pipe, an ignition control for controlling an igniting device to control the ignition timing of the engine 12, and a throttle opening control for controlling an angle of opening of an electronic throttle valve. The above-described electronic control device 50 applies to the above-described engine output control device 62, engine output control commands for controlling the output of the engine 12, such as a fuel injection amount signal for controlling the amount of injection of the fuel, an ignition signal for controlling the ignition timing, and an electronic throttle valve drive signal for controlling the angle of opening $\theta_{TH}$ of the electronic throttle valve. The above-described hybrid vehicle 10 is also provided with a hydraulic control device 64 constructed to generate a hydraulic pressure for controlling a shifting action of the above-described automatic transmission 20, for example, and the above-described electronic control device 50 applies control signals to the hydraulic control device 64, for controlling output hydraulic pressures of various solenoid-operated control valves provided in the hydraulic control device 64. The electronic control device 50 is further configured to apply various other command signals to various devices such as the first motor/generator MG1 and second motor/generator MG2.

FIG. 5 is the functional block diagram for explaining major control functions of the above-described electronic control device 50. Hybrid drive control means 70 shown in FIG. 5 is basically configured to select one of a plurality of drive states indicated in FIG. 6, for running the hybrid vehicle 10 in the selected drive state. Described more specifically, the hybrid drive control means 70 commands the above-described engine output control device 62 to control the above-described engine 12, and commands the above-described first motor/generator MG1 and second motor/generator MG2 to be placed in a vehicle driving state or an electricity generating state (regenerative state). In an "EV" drive state indicated in FIG. 6, the above-described starting clutch 26 is placed in its power cut-off state to disconnect the above-described engine 12 from the power transmitting path, and the above-described second motor/generator MG2 is controlled to be placed in the vehicle driving state to run the hybrid vehicle 10 in the forward or reverse direction. In this "EV" drive state, the above-described engine 12 is placed in its rest state (non-operated state). In a "series HEV" drive state, the above-described starting clutch 26 is placed in the power cut-off state to disconnect the above-described engine 12 from the power transmitting path, and the engine 12 is operated to rotate the first motor/generator MG1 so as to place the first motor/generator MG1 in the electricity generating state (regenerative state), while the above-described second motor/generator MG2 is controlled to be placed in the vehicle driving state to run the hybrid vehicle 10 in the forward or reverse direction, as in the "EV" drive state. The electric power (electric energy) generated by the above-described first motor/generator MG1 in the "series HEV" drive state is supplied to the above-described second motor/generator MG2 or used to charge the above-described electric-energy storage device 60. It is noted that the motor/generator placed in the vehicle driving state means the motor/generator operating as the electric motor, while the motor/generator placed in the electricity generating state means the motor/generator means operating as the electric generator.

In a "parallel HEV" drive state indicated in FIG. 6, the above-described starting clutch 26 is placed in its power transmitting state to connect the above-described engine 12 to the power transmitting path, so that the hybrid vehicle can be run with the engine 12, first motor/generator MG1 and second motor/generator MG2 being selectively used as the drive power source or sources. The "parallel HEV" drive state consists of three sub-states. In a first sub-state "a" (parallel HEV drive sub-state in a narrow sense), the above-described engine 12 is operated, and the above-described first motor/generator MG1 is controlled to be placed in the vehicle driving state, so that the hybrid vehicle is run with the engine 12 and first motor/generator MG1 being used as the drive power sources, while the above-described second motor/generator MG2 is controlled to be placed in a free state, without generation of an output torque. The second motor/generator MG2 rather than the first motor/generator MG1 may be controlled to be placed in the vehicle driving state, or both of the first motor/generator MG1 and the second motor/generator MG2 may be controlled to be placed in the vehicle driving state to make the vehicle drive force. In a second sub-state "b" (series parallel HEV drive sub-state), the above-described engine 12 is operated, and the above-described second motor/generator MG2 is controlled to be placed in the vehicle driving state, so that the hybrid vehicle is run with the engine 12 and second motor/generator MG2 being used as the drive power sources, while the above-described first motor/generator MG1 is controlled to be placed in the electricity generating state. The electric power generated by the first motor/generator MG1 is supplied to the above-described second motor/generator MG2, or stored in the electric-energy storage device 60. In a third sub-state "c" (engine drive sub-state), the hybrid vehicle is run with only the above-described engine 12 being operated as the drive power source. In this sub-state "c", the above-described first motor/generator MG1 and second motor/generator MG2 are controlled to be placed in the free state, without generation of an output torque.

In the above-indicated sub-state "a" (parallel HEV drive sub-state in the narrow sense), a large vehicle drive force can be generated than in the sub-state "c" (engine drive sub-state). The drive state is rapidly switched from the sub-state "c" to the sub-state "a" by controlling the above-described first motor/generator MG1 to be placed in the vehicle driving state to generate an assisting torque, when the accelerator pedal operation amount θacc is abruptly increased to accelerate the vehicle or raise the running speed of the vehicle. The sub-state "b" (series parallel HEV drive sub-state) is similar to the sub-state "a". However, the sub-state "a" is established when the electric energy amount SOC stored in the above-described electric-energy storage device 60 is relatively large, while the sub-state "b" is established when the electric energy amount SOC is relatively small. In the sub-states of the "parallel HEV" drive state, the forward-reverse switching device 22 is placed in the forward drive state or the reverse driving state, depending upon a selected position of a shift lever not shown.

The plurality of drive states indicated in FIG. 6 further includes a "decelerating run" drive state which is established when the accelerator pedal operation amount θacc is substantially zeroed (accelerator-off running) to decelerate the vehicle. In this "decelerating run" drive state, the above-described starting clutch 26 is placed in the power cut-off state to disconnect the above-described engine 12 from the power transmitting path, and the above-described second motor/generator MG2 is controlled to be placed in the electricity generating state, so that the vehicle is braked by rotational drag due to a regenerative braking force generated by the second motor/generator MG2, and the above-described electric-energy storage device 60 is charged with the electric energy generated by the second motor/generator MG2. The plurality of drive states may further include another drive state such as a drive state in which the vehicle is run with the engine (in the sub-state "c") while the above-described first motor/generator MG1 is controlled to be placed in the electricity generating state to charge the above-described electric-energy storage device 60, for example.

In the present embodiment described above, the "EV" drive state indicated in FIG. 6 corresponds to a first drive state in which the vehicle drive force is generated primarily by the above-described second motor/generator MG2 operated with the electric energy supplied from the above-described electric-energy storage device 60, while the above-described engine 12 is placed in the rest state. The "series HEV" drive state also indicated in FIG. 6 corresponds to a second drive state in which the above-described first motor/generator MG1 is operated with a drive force of the above-described engine 12, to generate an electric energy and in which the vehicle drive force is generated primarily by the above-described second motor/generator MG2 operated with at least one of the electric energy generated by the first motor/generator MG1 and the electric energy supplied from the above-described electric-energy storage device 60. The sub-state "a" of the "parallel HEV" drive state also indicated in FIG. 6 corresponds to a third drive state in which the vehicle drive force is generated by the above-described engine 12, and the above-described first motor/generator MG1 operated with the electric energy supplied from the above-described electric-energy storage device 60. In the "series HEV" drive state corresponding to the second drive state described above, the electric energy generated by the above-described first motor/generator MG1 may be supplied directly to the above-described second motor/generator MG2 through an inverter. However, the electric energy generated by the first motor/generator MG1 may be once stored in the above-described electric-energy storage device 60, and then supplied from the electric-energy storage device 60 to the above-described second motor/generator MG2.

Referring back to FIG. 5, drive mode determining means 72 is configured to determine one of the above-described drive modes of the hybrid vehicle 10, namely, one of the economy drive mode, normal drive mode and sporty drive mode, which has been selected by the vehicle operator with the manually operable member in the form of the above-described mode selector switch 56 illustrated by way of example. For instance, the drive mode determining means 72 determines that the normal drive mode is presently selected, if the above-described mode selector switch 56 has not been pressed, that the economy drive mode is presently selected, if the mode selector switch 56 has been pressed once, and that the sporty drive mode is presently selected, if the mode selector switch 56 has been pressed twice. Thus, the drive mode determining means 72 determines the selected one of the economy, normal and sporty drive modes, according to the operation of the above-described mode selector switch 56.

Figure 7:
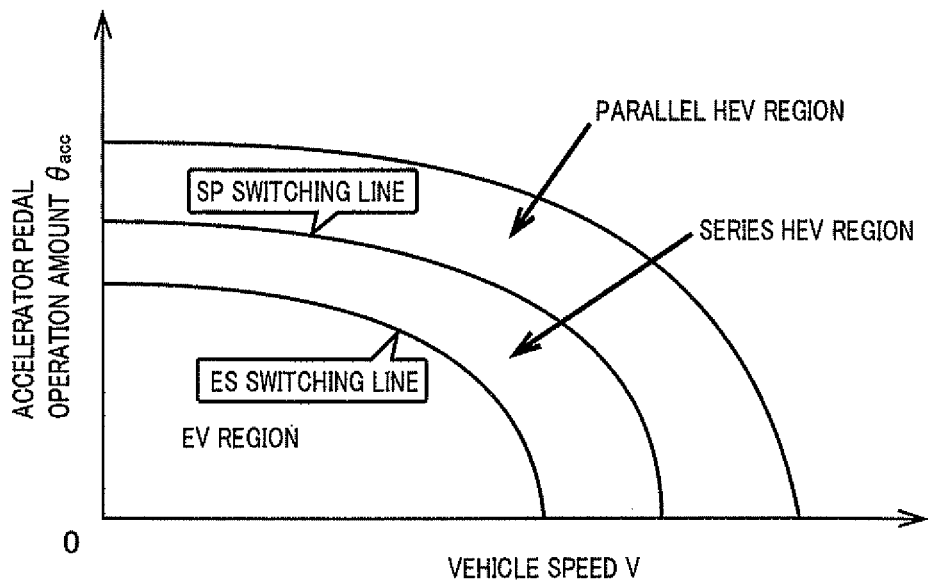
FIG. 7 is a view showing one example of a relationship used to determine one of the drive states of FIG. 6, in the drive system of the hybrid vehicle of FIG. 1.

Drive state determining means 74 is configured to determine one of the above-described plurality of drive states which should be established, on the basis of the vehicle running speed V and the accelerator pedal operation amount θacc, and according to a predetermined relationship. Namely, the drive state determining means 74 determines one of the drive states including at least the above-described "EV" drive state, "series HEV" drive state and sub-state "a" of the "parallel HEV" drive state respectively corresponding to the first, second and third drive states, which one drive state should be established. FIG. 7 is the view showing one example of the relationship used by the drive state determining means 74 to determine one of the drive states. One of the drive states described above by reference to FIG. 6 is selected according to a predetermined two-dimensional drive state switching map using two parameters in the form of the vehicle running speed V, and a value relating to the required vehicle drive force, such as the operation amount θacc or angle of opening θ$_{TH}$ of the accelerator pedal, as indicated in FIG. 7. This drive state switching map is stored in a memory device 68, for example. The drive state switching map has an ES switching line defining an EV region in which the "EV" drive state should be established, and a series HEV region in which the "series HEV" drive state should be established, and an SP switching line defining the series HEV region, and a parallel HEV region in which the "parallel HEV" drive state should be established. The EV region lies on one side of the ES switching line on which the required vehicle drive force and the vehicle running speed are respectively smaller and lower, and the series HEV region lies between the ES switching line and the SP switching line, while the parallel HEV region lies on one side of the SP switching line on which the required drive force and the vehicle running speed are respectively larger and higher. These switching lines are provided with hysteresis to prevent frequent switching of the drive state due to a small amount of change of the vehicle running speed or required vehicle drive force. It is noted that one of the drive states of the hybrid vehicle 10 is selected on the basis of conditions other than the relationship indicated in FIG. 7. When the electric energy amount SOC detected by the above-described SOC sensor 58 is not larger than a predetermined lower limit, for instance, the "EV" drive state is not selected, and the "series HEV" drive state is selected to perform the electricity generating operation, or an engine drive state is selected to operate the above-described engine 12 so that the vehicle drive force is generated primarily by the engine 12. Although only one relationship indicated in FIG. 7 by way of example is used for all of the above-described economy, normal and sporty drive modes, predetermined different drive state switching maps corresponding to the respective economy, normal and sporty drive states may be stored in the memory device 68.

Referring back to FIG. 5, the above-described hybrid drive control means 70 includes output characteristic setting means 76. This output characteristic setting means 76 is configured to set output characteristics of a target value T* of the vehicle drive force (target vehicle drive force) corresponding to the operation amount θacc or angle of opening θ$_{TH}$ of the accelerator pedal or any other value relating to the required vehicle drive force (a required value of the vehicle drive force represented by an amount of operation of a manually operable member by the vehicle operator), on the basis of the drive state selected by the above-described drive state determining means 74, and according to predetermined relationships. For example, different output characteristic maps for determining the target vehicle drive force corresponding to the accelerator pedal operation amount θacc are respectively used for the "EV" drive state, "series HEV" drive state and sub-state "a" of the "parallel HEV" drive state, which correspond to the respective first, second and third drive states.

Figure 8:
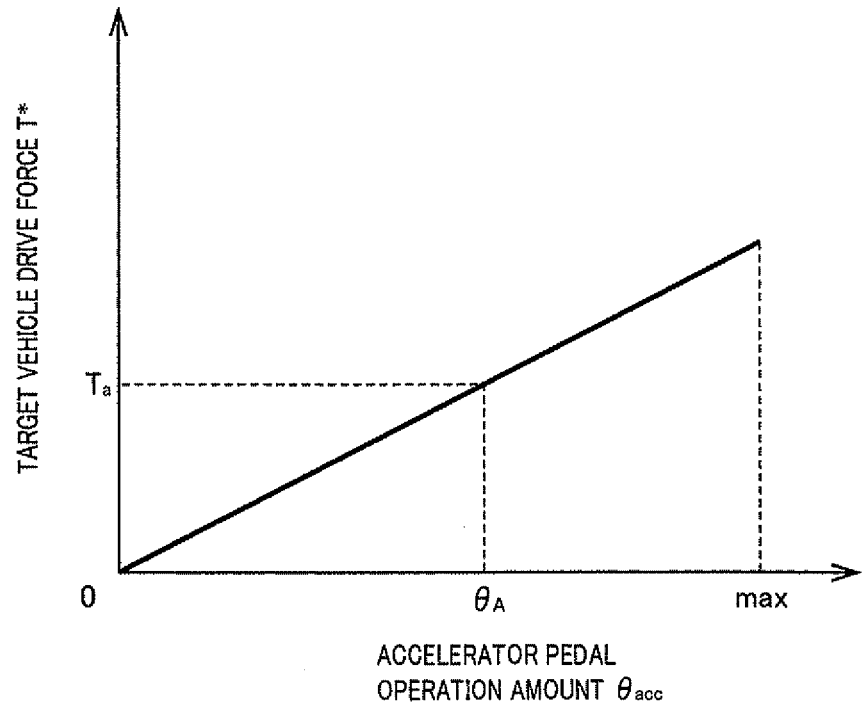
FIG. 8 is a view showing an example of an output characteristic map used for a drive control of the hybrid vehicle of FIG. 1, for determining the vehicle drive force corresponding to an operation amount of an accelerator pedal, which output characteristic map corresponds to the first drive state in the form of an "EV" drive state.
Figure 9:
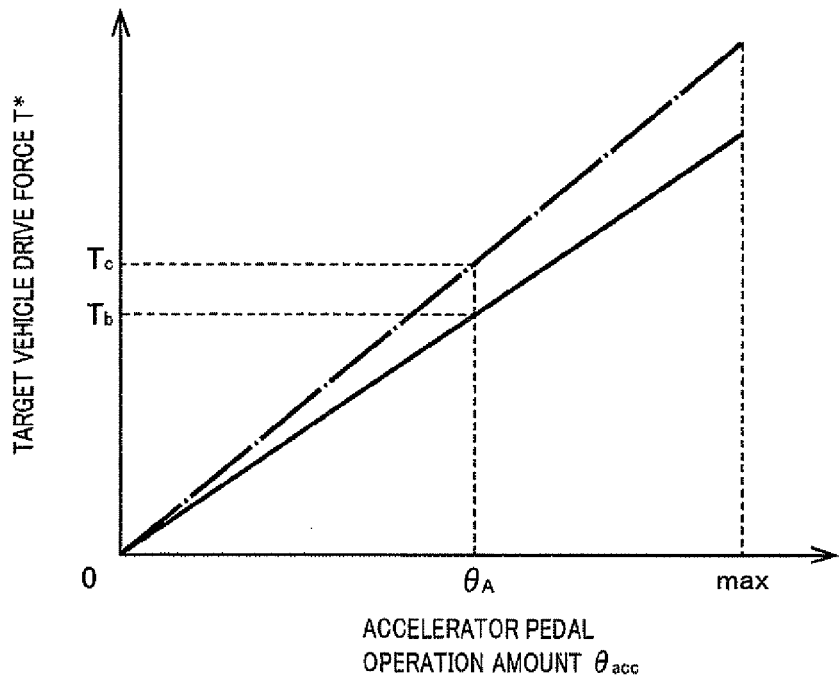
FIG. 9 is a view showing another example of an output characteristic map used for the drive control of the hybrid vehicle of FIG. 1, for determining the vehicle drive force corresponding to the operation amount of the accelerator pedal, which output characteristic map corresponds to the second drive state in the form of a "series HEV" drive state.

FIGS. 8 and 9 are views showing examples of the output characteristic maps used by the above-described hybrid drive control means 70 for the hybrid drive control, to determine the target vehicle drive force corresponding to the accelerator pedal operation amount θacc. The output characteristic map of FIG. 8 corresponds to the first drive state in the form of the "EV" drive state, while the output characteristic map of FIG. 9 corresponds to the second drive state in the form of the "series HEV" drive state. As indicated in FIGS. 8 and 9, the output characteristic map corresponding to the second drive state in the form of the "series HEV" drive state is formulated such that the target vehicle drive force generated in the second drive state at a given value of the accelerator pedal operation amount θacc is larger that that in the first drive state according to the output characteristic map corresponding to the first drive state in the form of the "EV" drive state. Namely, for example, the output characteristic maps of FIGS. 8 and 9 are formulated such that the target vehicle drive force Tb generated at a given value θ$_A$ of the accelerator pedal operation amount θacc according to the output characteristic map of FIG. 9 is larger than the target vehicle drive force Ta generated for the given value θ$_A$ of the accelerator pedal operation amount θacc according to the output characteristic map of FIG. 8 (that is, such that Tb>Ta). Namely, the above-described output characteristic setting means 76 sets the output characteristics such that a larger vehicle drive force is generated at a given value of the accelerator pedal operation amount θacc in the second drive state in the form of the "series HEV" drive state, than in the first drive state in the form of the "EV" drive state.

One-dot chain line in FIG. 9 represents the output characteristic map corresponding to the third drive state in the form of the sub-state "a" of the "parallel HEV" drive state. This output characteristic map indicated by the one-dot chain line and corresponding to the third drive state in the form of the sub-state "a" of the "parallel HEV" drive state is preferably formulated such that a larger vehicle drive force is generated at a given value of the accelerator pedal operation amount θacc in the third drive state than that generated according to the output characteristic map corresponding to the second drive state in the form of the "series HEV" drive state. Namely, the output characteristic maps of FIG. 9 are formulated such that the target vehicle drive force Tc generated at a given value θ$_A$ of the accelerator pedal operation amount θacc according to the output characteristic map corresponding to the sub-mode "a" of the "parallel HEV" drive state is larger than the target vehicle drive force Tb generated at the given value θ$_A$ of the accelerator pedal operation amount θacc according to the output characteristic map corresponding to the "series HEV" drive state (that is, such that Tc>Tb). Alternatively, the output characteristic according to the output characteristic map corresponding to the third drive state in the form of the sub-state "a" of the "parallel HEV" drive state may be identical with that according to the output characteristic map corresponding to the second drive state in the form of the "series HEV" drive state. Namely, the output characteristic maps may be formulated such that the target vehicle drive forces Tc and Tb indicated in FIG. 9 are equal to each other (that is, such that Tc=Tb). Namely, the above-described output characteristic setting means 76 sets the output characteristics such that the vehicle drive force generated at a given value of the accelerator pedal operation amount θacc in the third drive state in the form of the sub-state "a" of the "parallel HEV" drive state, is larger than or equal to that generated in the second drive state in the form of the "series HEV" drive state.

The above-described output characteristic setting means 76 changes the target vehicle drive force T* so as to prevent an abrupt change of the vehicle drive force (abrupt vehicle acceleration or deceleration) upon changing of the output characteristic, for example, from the output characteristic according to the output characteristic map of FIG. 8 corresponding to the "EV" drive state to that according to the output characteristic map of FIG. 9 corresponding to the "series HEV" or "parallel HEV" drive state, or from the output characteristic according to the output characteristic map of FIG. 9 corresponding to the "series HEV" or "parallel HEV" drive state to that according to the output characteristic map of FIG. 8 corresponding to the "EV" drive state. If the drive state is switched from the "EV" drive state to the "series HEV" drive state at an accelerator pedal operation amount θ$_A$, for example, the target vehicle drive force is changed from Ta to Tb as a result of the corresponding change of the output characteristic map. In this event, the target vehicle drive force is gradually changed from Ta to Tb such that the target vehicle drive force is smoothly increased to Tb according to a relationship obtained by experimentation, but as rapidly as possible to the extent which does not cause the vehicle operator to feel abrupt vehicle acceleration. If the drive state is switched from the "series HEV" drive state to the "EV" drive state at the accelerator pedal operation amount $\theta_A$, the target vehicle drive force is changed from Tb to Ta as a result of the corresponding change of the output characteristic map. In this event, the target vehicle drive force is gradually changed from Tb to Ta such that the target vehicle drive force is smoothly reduced to Ta according to a relationship obtained by experimentation, but as rapidly as possible to the extent which does not cause the vehicle operator to feel abrupt vehicle deceleration.

Preferably, the above-described output characteristic setting means 76 is configured to select one of the output characteristic maps representative of the relationships for determining the target vehicle drive force corresponding to the accelerator pedal operation amount $\theta$acc, depending upon the drive mode selected by the above-described drive mode determining means 72. Preferably, the output characteristic setting means 76 sets the output characteristic such that the vehicle drive force generated at a given value of the accelerator pedal operation amount $\theta$acc in the above-described normal drive mode is larger than that generated in the above-described economy drive mode, and such that the vehicle drive force generated at a given value of the accelerator pedal operation amount $\theta$acc in the above-described sporty drive mode is larger than that generated in the above-described normal drive mode. Further, the output characteristic setting means 76 sets the output characteristic in each of the economy, normal and sporty drive modes such that the vehicle drive force generated at a given value of the accelerator pedal operation amount $\theta$acc in the second drive state in the form of the "series HEV" drive mode is larger than that generated in the first drive state in the form of the "EV" drive mode. Similarly, the output characteristic setting means 76 sets the output characteristic in each of the economy, normal and sporty drive modes such that the vehicle drive force generated at a given value of the accelerator pedal operation amount $\theta$acc in the third drive state in the form of the sub-state "a" of the "parallel HEV" drive mode is larger than or equal to that generated in the second drive state in the form of the "series HEV" drive mode, as described previously.

Figure 10:
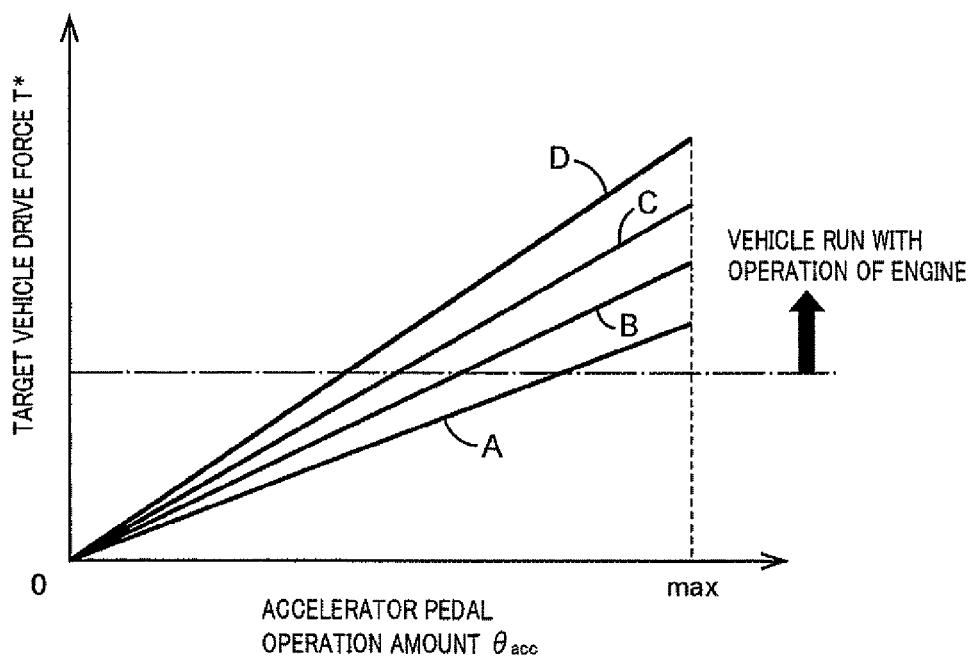
FIG. 10 is a view showing examples of output characteristic maps used for a hybrid drive control in various drive modes to be selectively established in the hybrid vehicle of FIG. 1, for determining the vehicle drive force corresponding to the operation amount of the accelerator pedal.

FIG. 10 is the view showing examples of the output characteristic maps used for the hybrid drive control by the above-described hybrid drive control means 70 in the above-described economy, normal and sporty drive modes, for determining the vehicle drive force corresponding to the accelerator pedal operation amount $\theta$acc, and FIG. 11 is the table indicating the output characteristic maps of FIG. 10 to be selected depending on the drive state and drive mode of the above-described hybrid vehicle 10. The output characteristic maps indicated in FIG. 10 are predetermined and stored in the above-described memory device 68, for instance. The above-described output characteristic setting means 76 is basically configured to select one of the output characteristic maps A-D indicated in FIG. 10, depending upon the presently selected drive state and drive mode of the above-described hybrid vehicle 10, as indicated in FIG. 11.

Namely, when the drive state in which the above-described engine 12 is placed in the rest state, that is, the "EV" or "decelerating run" drive state indicated in FIG. 6, and the economy drive mode are presently selected, the output characteristic setting means 76 selects the output characteristic map A according to which the target vehicle drive force generated at a given value of the accelerator pedal operation amount $\theta$acc is the smallest of the target vehicle drive forces generated according to the output characteristic maps indicated in FIG. 10. When the drive state in which the above-described engine 12 is placed in the rest state, and the normal drive mode are presently selected, the output characteristic setting means 76 selects the output characteristic map B according to which the target vehicle drive force generated at a given value of the accelerator pedal operation amount $\theta$acc is the second smallest of the target vehicle drive forces according to the output characteristic maps indicated in FIG. 10 (is larger than the target vehicle drive force according to the output characteristic map A and smaller than the target vehicle drive force according to the output characteristic map C). When the drive state in which the above-described engine 12 is placed in the rest state, and the sporty drive mode are presently selected, the output characteristic setting means 76 selects the output characteristic map C according to which the target vehicle drive force generated at a given value of the accelerator pedal operation amount $\theta$acc is the second largest of the target vehicle drive forces according to the output characteristic maps indicated in FIG. 10 (is larger than the target vehicle drive force according to the output characteristic map B and smaller than the target vehicle drive force according to the output characteristic map D).

When the drive state in which the above-described engine 12 is placed in the operated state, that is, the "series HEV" or "parallel HEV" drive state indicated in FIG. 6, and the economy drive mode are presently selected, the output characteristic setting means 76 selects the output characteristic map B according to which the target drive force generated at a given value of the accelerator pedal operation amount $\theta$acc is the second smallest of the target vehicle drive forces according to the output characteristic maps indicated in FIG. 10. When the drive state in which the above-described engine 12 is placed in the operated state, and the normal drive mode are presently selected, the output characteristic setting means 76 selects the output characteristic map C according to which the target vehicle drive force generated at a given value of the accelerator pedal operation amount $\theta$acc is the second largest of the target vehicle drive forces according to the output characteristic maps indicated in FIG. 10. When the drive state in which the above-described engine 12 is placed in the operated state, and the sporty drive mode are presently selected, the output characteristic setting means 76 selects the output characteristic map D according to which the target drive force generated at a given value of the accelerator pedal operation amount $\theta$acc is the largest of the target vehicle drive forces according to the output characteristic maps indicated in FIG. 10.

As described above, the output characteristics corresponding to the respective combinations of the drive state and the drive mode of the above-described hybrid vehicle 10 are set or selected according to the relationships indicated in FIGS. 10 and 11, so that the vehicle drive force generated in the above-described normal drive mode at a given value of the accelerator pedal operation amount $\theta$acc is larger than that generated in the above-described economy drive mode, and so that the vehicle drive force generated in the above-described sporty drive mode at a given value of the accelerator pedal operation amount $\theta$acc is larger than that generated in the above-described normal drive mode, while the vehicle drive force generated at a given value of the accelerator pedal operation amount $\theta$acc in the "series HEV" drive state in which the above-described engine 12 is placed in the operated state is larger, in each of the economy, normal and sporty drive modes, than that generated in the "EV" drive state in which the engine 12 is placed in the rest state.

The above-described output characteristic setting means 76 is preferably configured to change the above-described output characteristic when the accelerator pedal operation amount θacc has been reduced to or below a predetermined value (preferably "0"), if the drive mode is changed by the vehicle operator, from one of the above-described economy, normal and sporty drive modes to another. If the accelerator pedal operation amount θacc detected by the above-described accelerator pedal operation amount sensor 52 when the above-described mode selector switch 56 is operated is not equal to or smaller than the predetermined value, preferably, is not zero (θacc=0), that is, if the accelerator pedal has not been brought into its non-operated state, for example, the output characteristic setting means 76 changes the above-described output characteristic when the accelerator pedal operation amount θacc has been reduced to or below the predetermined value (preferably, when the accelerator pedal has been brought into its non-operated state).

Figure 12:
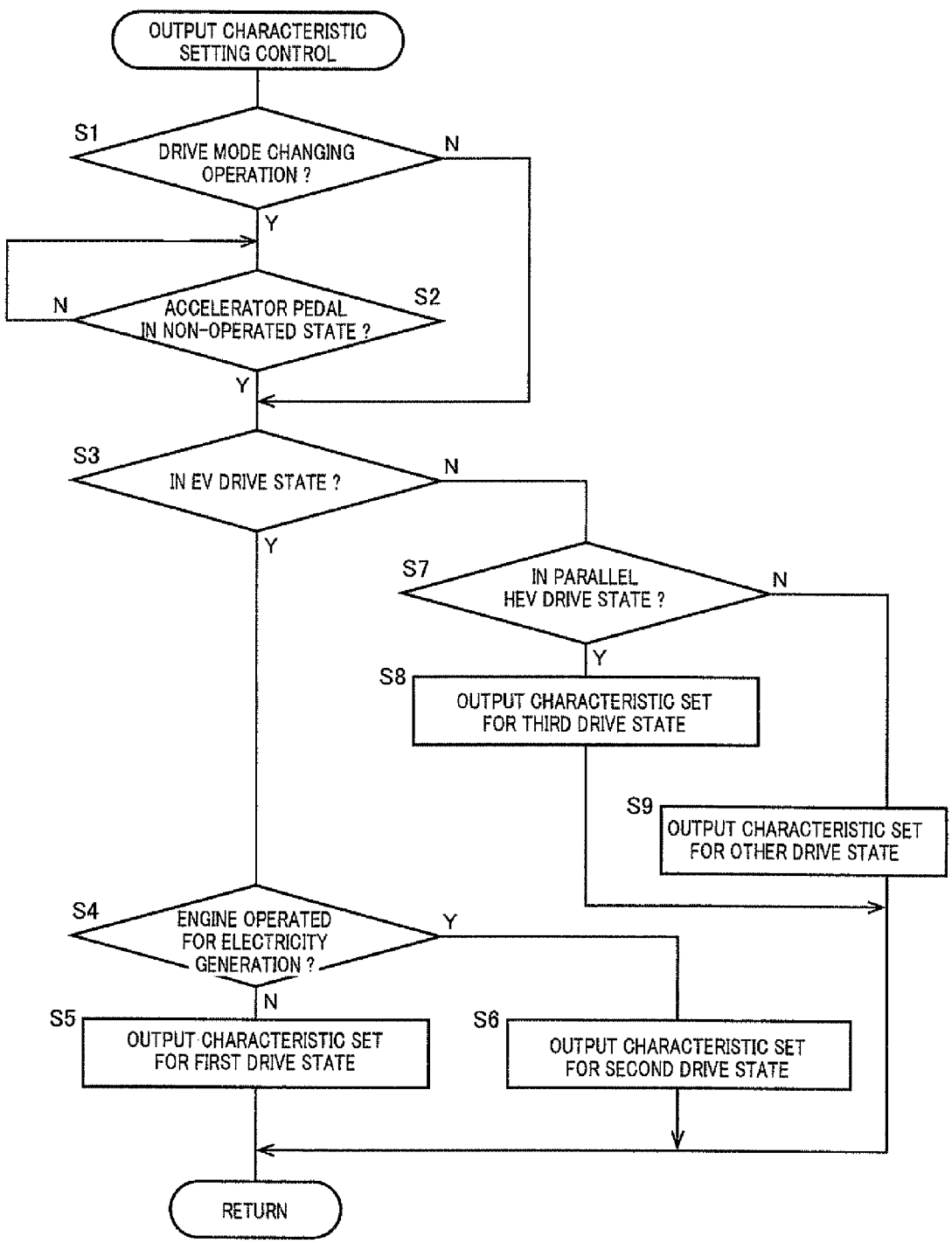
FIG. 12 is a flow chart for explaining major portions of an output characteristic setting control implemented by the electronic control device of FIG. 3.

FIG. 12 is the flow chart for explaining major portions of an output characteristic setting control implemented by the above-described electronic control device 50. The flow chart is executed repeatedly with predetermined intervals.

Initially, step S1 (hereinafter "step" being omitted) is implemented to determine whether the drive mode of the above-described hybrid vehicle 10 has been changed as a result of an operation of the above-described mode selector switch 56, for instance. If a negative determination is obtained in S1, the control flow goes to S3 and the following steps. If an affirmative determination is obtained in S1, the control flow goes to S2 to determine whether the accelerator pedal is placed in the non-operated state, that is, whether the accelerator pedal operation amount θacc detected by the above-described accelerator pedal operation amount sensor 52 is zero. If a negative determination is obtained in S2, this step is repeated implemented until an affirmative determination is obtained in S2. If the affirmative determination is obtained in S2, the control flow goes to S3 to determine whether the above-described hybrid vehicle 10 is placed in the "EV" drive state, that is, in the drive state in which the above-described second motor/generator MG2 is primarily operated as the vehicle drive power source. This determination is made on the basis of the vehicle running speed V and the accelerator pedal operation amount θacc, and according to the relationship indicated in FIG. 7.

If a negative determination is obtained in S3, namely, if the above-described hybrid vehicle 10 is determined not to be placed in the drive state in which the above-described second motor/generator MG2 is primarily operated as the vehicle drive power source, the control flow goes to S7 and the following steps. If an affirmative determination obtained in S3, namely, if the above-described hybrid vehicle 10 is determined to be placed in the drive state in which the above-described second motor/generator MG2 is primarily operated as the vehicle drive power source, the control flow goes to S4 to determine whether the above-described engine 12 is operated to generate an electric energy. If a negative determination is obtained in S4, it is determined that the hybrid vehicle is placed in the first drive state in which the vehicle drive force is generated primarily by the above-described second motor/generator MG2 operated with the electric energy supplied from the above-described electric-energy storage device 60 while the above-described engine 12 is placed in the rest state. In this case, the control flow goes to S5 to set the output characteristic corresponding to the first drive state, one cycle of execution of the present routine is terminated. This setting of the output characteristic is implemented depending upon the selected one of the economy, normal and sporty drive modes. If an affirmative determination is obtained in S4, it is determined that the hybrid vehicle is placed in the second drive state in which the above-described engine 12 is operated to operate the above-described first motor/generator MG1 to generate an electric energy, and in which the vehicle drive force is generated primarily by the above-described second motor/generator MG2 operated with at least one of the electric energy generated by the first motor/generator MG1 and the electric energy supplied from the above-described electric-energy storage device 60. In this case, the control flow goes to S6 to set the output characteristic corresponding to the second drive state, one cycle of execution of the present routine is terminated. This setting of the output characteristic is implemented depending upon the selected one of the economy, normal and sporty drive modes.

S7 is implemented to determine whether the above-described hybrid vehicle 10 is placed in the "parallel HEV" drive state, that is, in the third drive state in which the vehicle drive force is generated by the above-described engine 12, and the above-described first motor/generator MG1 operated with the electric energy supplied from the above-described electric-energy storage device 60. If an affirmative determination is obtained in S7, the control flow goes to S8 to set the output characteristic corresponding to the third drive state, and one cycle of execution of the present routine is terminated. This setting of the output characteristic is implemented differently depending upon the selected one of the economy, normal and sporty drive modes. If a negative determination is obtained in S7, the control flow goes to S9 to set the output characteristic corresponding to any other drive state, for instance, the output characteristic corresponding to the engine drive state, and one cycle of execution of the present routine is terminated. In the routine illustrated in FIG. 12, S1 corresponds to an operation of the above-described drive mode determining means 72, and S3, S4 and S7 correspond to an operation of the above-described drive state determining means 74, while S5, S6, S8 and S9 correspond to an operation of the above-described hybrid drive control means 70 (output characteristic setting means 76).

The present embodiment is configured to selectively establish one of the first drive state in which the vehicle drive force is generated primarily by the above-described second motor/generator MG2 operated with the electric energy supplied from the above-described electric-energy storage device 60 while the above-described engine 12 is placed in the rest state, and the second drive state in which the above-described first motor/generator MG1 is operated with the drive force of the above-described engine 12, to generate an electric energy and in which the vehicle drive force is generated primarily by the above-described second motor/generator MG2 operated with at least one of the electric energy generated by the above-described first motor/generator MG1 and the electric energy supplied from the above-described electric-energy storage device 60. The present embodiment is further configured to set the output characteristic such that the vehicle drive force generated in the above-indicated second drive state at a given value of the accelerator pedal operation amount θacc is larger than that generated in the above-indicated first drive state. Thus, the output characteristic is set such that the vehicle drive force generated primarily by the electric motor in the drive state in which the engine 12 is placed in the operated state is larger than that generated in the drive state in which the vehicle drive force is generated by only the electric motor, so that the vehicle operator hearing an operating sound of the engine 12 can feel drivability of the hybrid vehicle 10 as expected from the operating sound. Namely, the electronic control device 50 permits a higher degree of drivability of the hybrid vehicle 10 depending upon whether the engine is in the operated state or not.

The present embodiment is further configured to selectively establish one of the above-described first drive state, the above-described second drive state, and the third drive state in which the vehicle drive force is generated by the above-described engine 12 and the above-described first motor/generator MG1 operated with the electric energy supplied from the above-described electric-energy storage device 60, and to control the hybrid vehicle such that the vehicle drive force generated in the above-described third drive state at a given value of the accelerator pedal operation amount θacc is equal to that generated in the above-described second drive state. Thus, the output characteristic is set such that the vehicle drive force generated in the drive state in which the vehicle drive force is generated by the above-described engine 12 and first motor/generator MG1 is larger than that generated in the drive state in which the vehicle drive force is generated by only the above-described second motor/generator MG2, so that the vehicle operator hearing the operating sound of the engine 12 can feel drivability of the hybrid vehicle as expected from the operating sound.

Further, the output characteristic is set such that the vehicle drive force generated at a given value of the accelerator pedal operation amount θacc in the third drive state is larger than that generated in the second drive state. Thus, the output characteristic is set such that the vehicle drive force generated in the drive state in which the vehicle drive force is generated by the above-described engine 12 and first motor/generator MG1 is larger than that generated in the drive state in which the vehicle drive force is generated by only the above-described second motor/generator MG2, and is further larger than that generated in the drive state in which the above-described engine 12 is operated primarily to generate an electric energy, so that the vehicle operator hearing the operating sound of the engine 12 can feel drivability of the hybrid vehicle as expected from the operating sound.

The present embodiment is also configured to selectively establish one of the economy drive mode, the normal drive mode and the sporty drive mode, according to the operation by the hybrid vehicle operator, and to control the hybrid vehicle such that the vehicle drive force generated in the above-described normal drive mode at a given value of the accelerator pedal operation amount θacc is larger than that generated in the above-described economy drive mode, and such that the vehicle drive force generated in the above-described sporty drive mode at a given value of the accelerator pedal operation amount θacc is larger than that generated in the above-described normal drive mode. Thus, the output characteristic for the vehicle drive force is set differently depending upon one of the drive modes established according to the operation by the operator of the hybrid vehicle, and such that the vehicle drive force generated primarily by the electric motor in each of the drive modes and in the drive state in which the engine 12 is placed in the operated state is larger than that generated in the drive state in which the vehicle drive force is generated by only the electric motor, so that the running of the hybrid vehicle can be intricately controlled as intended by the operator of the hybrid vehicle.

The present embodiment is further configured such that when the drive mode is changed from the presently established one of the above-described economy, normal and sporty drive modes to another according to the operation of the operator of the hybrid vehicle, the output characteristic of the hybrid vehicle is changed when the operation amount θacc of the accelerator pedal has been reduced to or below the predetermined value. Accordingly, it is possible to effectively prevent deterioration of the drivability of the hybrid vehicle due to a change of the output characteristic of the vehicle drive force immediately after the operation of the operator of the hybrid vehicle to change the drive mode.

Other preferred embodiments of this invention will be described in detail by reference to the drawings. In the following description, the same reference signs will be used to identify the same elements in the different embodiments, which will not be described.

FIG. 13 is the schematic view showing an arrangement of a drive system of another hybrid vehicle to which the present invention is suitably applicable. In this hybrid drive system 100 shown in FIG. 13, the above-described engine 12 is subjected to a cranking action by a starter motor 102 connected to the crankshaft 14 through a belt, for example. The hybrid drive system 100 is provided with a step-variable automatic transmission 104 of a planetary gear type, for instance, which has a plurality of speed positions and a neutral position which are selectively established by engaging and releasing actions of a plurality of clutches and brakes. Between an input shaft 106 of the automatic transmission 104 and the crankshaft 104, there is interposed a starting clutch 108 configured to selectively place a power transmitting path therebetween in a power transmitting state and a power cut-off state. The above-indicated starter motor 102 is a motor/generator which also has a function of an electric generator. The above-described first gear 25 is mounted on an output shaft 110 of the above-described automatic transmission 104, so that the vehicle drive force is transmitted from the first gear 25 to the front drive wheels 40L and 40R. The present hybrid drive system 100 is provided with a rear wheel drive device 120 wherein a rotary motion of a rear drive motor/generator RMG is transmitted through a fifth gear 122 and a sixth gear 124 to rotate a differential gear device 126, a rotary motion of which is transmitted to left and right rear drive wheels 130L and 130R through left and right axles 128L and 128R. In the hybrid drive system 100, the above-described starter motor 102 corresponds to a first electric motor, while the above-described rear drive motor/generator RMG corresponds to a second electric motor. These starter motor 102 and rear drive motor/generator RMG are operated with electric energies supplied from the electric-energy storage device 60 not shown, and the generated electric energy is stored in the electric-energy storage device 60.

The hybrid drive system 100 constructed as described above is also controlled so as to selectively establish one of a first drive state in which a vehicle drive force is generated primarily by the above-described rear drive motor/generator RMG operated with the electric energy supplied from the above-described electric-energy storage device 60, while the above-described engine 12 is placed in the rest state, and a second drive state in which the above-described starter motor 102 is operated with the drive force of the above-described engine 12, to generate an electric energy and in which the vehicle drive force is generated primarily by the above-described rear drive motor/generator RMG operated with at least one of the electric energy generated by the starter motor 102 and the electric energy supplied from the above-described electric-energy storage device 60. Like the drive system of the hybrid vehicle 10 according to the preceding embodiment, the present hybrid drive system 100 is functionally provided with the above-described electronic control device 50 having control means such as the hybrid drive control means 70, drive motor determining means 72, drive state determining means 74 and output characteristic setting means 76. The output characteristic setting means 76 controls the hybrid drive system 100 such that the vehicle drive force generated in the above-indicated second drive state at a given value of the accelerator pedal operation amount θacc is larger than that generated in the above-described first drive state. As in the preceding embodiment, the hybrid drive system 100 of FIG. 13 according to the present embodiment is provided with a control apparatus which permits a higher degree of drivability of the hybrid vehicle depending upon whether the engine is in the operated state or not by applying the present invention.

FIG. 14 are the views for explaining a drive system of a further hybrid vehicle to which the present invention is suitably applicable, FIG. 14(*a*) being the schematic view showing an arrangement of the drive system, while FIG. 14(*b*) being the view for explaining a plurality of drive states to be selectively established in the hybrid vehicle. In this hybrid drive system 150 shown in FIG. 14, the above-described engine 12, a first clutch 152, the first motor/generator MG1, a second clutch 154 and the second motor/generator MG2 are disposed in series coaxially with each other, and an output gear 156 interposed between the second clutch 154 and the second motor/generator MG2 is held in meshing engagement with the above-described fourth gear 34. Like the drive system of the hybrid vehicle 10 described above with respect to the preceding embodiment, the present hybrid drive system 150 is configured to selectively establish one of the "EV" drive state, the "series HEV" drive state, the "parallel HEV" drive state having the three sub-states, and the "decelerating run" drive state, as shown in FIG. 14(*b*). In the present hybrid drive system 150, the above-described first motor/generator MG1 corresponds to a first electric motor, while the above-described second motor/generator MG2 corresponds to a second electric motor. These first motor/generator MG1 and second motor/generator MG2 are operated with electric energies supplied from the electric-energy storage device 60 not shown, and the generated electric energy is stored in the electric-energy storage device 60.

The hybrid drive system 150 constructed as described above is also controlled so as to selectively establish one of a first drive state in the form of the "EV" drive state in which a vehicle drive force is generated primarily by the above-described second motor/generator MG2 operated with the electric energy supplied from the above-described electric-energy storage device 60, while the above-described engine 12 is placed in the rest state, and a second drive state in the form of the "series HEV" drive state in which the above-described first motor/generator MG1 is operated with the drive force of the above-described engine 12, to generate an electric energy and in which the vehicle drive force is generated primarily by the above-described second motor/generator MG2 operated with at least one of the electric energy generated by the first motor/generator MG1 and the electric energy supplied from the above-described electric-energy storage device 60. Like the drive system of the hybrid vehicle 10 according to the preceding embodiment, the present hybrid drive system 150 is provided with the above-described electronic control device 50 having control means such as the hybrid drive control means 70, drive mode determining means 72, drive state determining means 74 and output characteristic setting means 76 from a functional aspect. The output characteristic setting means 76 controls the hybrid drive system 150 such that the vehicle drive force generated in the above-indicated second drive state at a given value of the accelerator pedal operation amount θacc is larger than that generated in the above-described first drive state. As in the preceding embodiment, the hybrid drive system 150 of FIG. 14 according to the present embodiment is provided with a control apparatus which permits a higher degree of drivability of the hybrid vehicle depending upon whether the engine is in the operated state or not by applying the present invention.

Figure 15A:
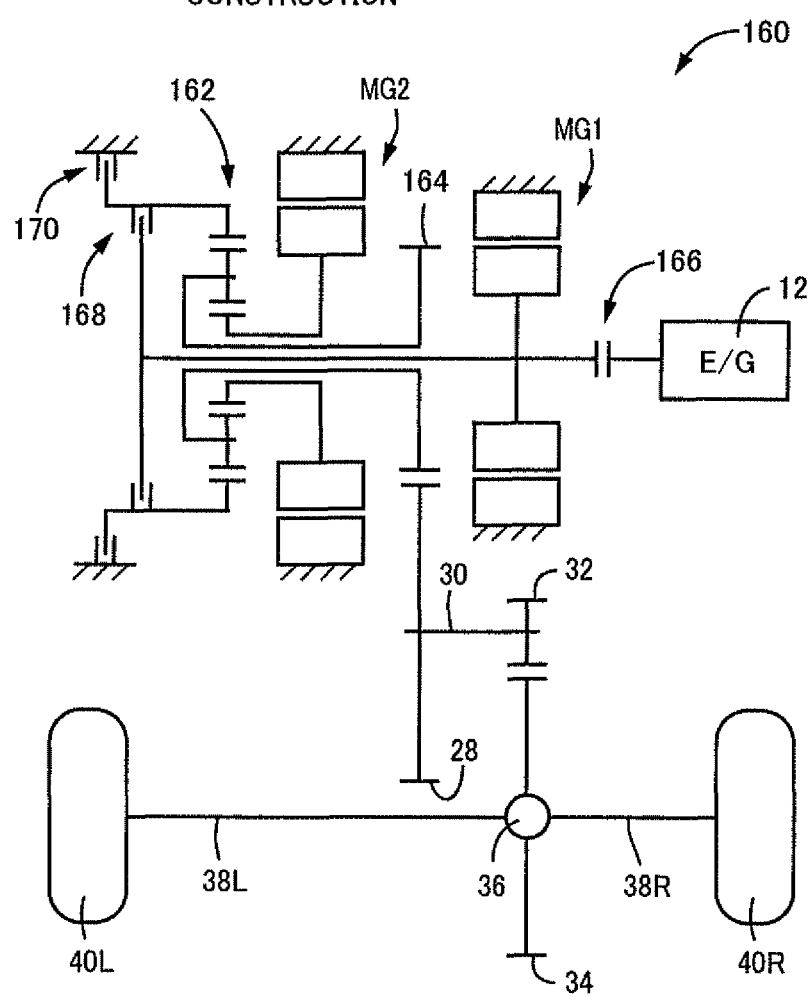
FIG. 15 are views for explaining a drive system of a still further hybrid vehicle to which the present invention is suitably applicable, FIG. 15(a) being a schematic view showing an arrangement of the drive system, while FIG. 15(b) being a view for explaining a plurality of drive states to be selectively established in the hybrid vehicle.

FIG. 15 are the views for explaining a drive system of a still further hybrid vehicle to which the present invention is suitably applicable, FIG. 15(*a*) being the schematic view showing an arrangement of the drive system, while FIG. 15(*b*) being the view for explaining a plurality of drive states to be selectively established in the hybrid vehicle. In the hybrid drive system 160 shown in FIG. 15, the above-described engine 12, first motor/generator MG1 and second motor/generator MG2, and an output gear 164 are connected to a planetary gear set 162, and a first clutch 166 is interposed between the engine 12 and the first motor/generator MG1, while the first motor/generator MG1 is connected to a ring gear of the planetary gear set 162 through a second clutch 168. The ring gear of the planetary gear set 162 can be fixed to a stationary member through a brake 170. The second motor/generator MG2 is connected to a sun gear of the above-described planetary gear set 162, and an output gear 164 is connected to a carrier of the planetary gear set 162, while the output gear 164 is held in meshing engagement with the above-described second gear 28.

Like the drive system of the hybrid vehicle 10 according to the previously described embodiment, the above-described hybrid drive system 160 is configured to selectively establish one of the "EV" drive state, the "series HEV" drive state, the "parallel HEV" drive state having the two sub-states, and the "decelerating run" drive state, as shown in FIG. 15(*b*). In the present hybrid drive system 160, the above-described first motor/generator MG1 corresponds to a first electric motor, while the above-described second motor/generator MG2 corresponds to a second electric motor. These first motor/generator MG1 and second motor/generator MG2 are operated with electric energies supplied from the electric-energy storage device 60 not shown, and the generated electric energy is stored in the electric-energy storage device 60.

The hybrid drive system 160 constructed as described above is also controlled so as to selectively establish one of a first drive state in the form of the "EV" drive state in which a vehicle drive force is generated primarily by the above-described second motor/generator MG2 operated with the electric energy supplied from the above-described electric-energy storage device 60, while the above-described engine 12 is placed in the rest state, and a second drive state in the form of the "series HEV" drive state in which the above-described first motor/generator MG1 is operated with the drive force of the above-described engine 12, to generate an electric energy and in which the vehicle drive force is generated primarily by the above-described second motor/generator MG2 operated with at least one of the electric energy generated by the first motor/generator MG1 and the electric energy supplied from the above-described electric-energy storage device 60. Like the drive system of the hybrid vehicle 10 according to the previously described embodiment, the present hybrid drive system 160 is provided with the above-described electronic control device 50 having control means such as the hybrid drive control means 70, drive mode determining means 72, drive state determining means 74 and output characteristic setting means 76 from a functional aspect. The output characteristic setting means 76 controls the hybrid drive system 160 by setting its output characteristic such that the vehicle drive force generated in the above-indicated second drive state at a given value of the accelerator pedal operation amount θacc is larger than that generated in the above-described first drive state. As in the preceding embodiment, the hybrid drive system 160 of FIG. 15 according to the present embodiment is provided with a control apparatus which permits a higher degree of drivability of the hybrid vehicle depending upon whether the engine is in the operated state or not by applying the present invention.

While the preferred embodiments of this invention have been described in detail by reference to the drawings, it is to be understood that the invention is not limited to the details of the illustrated embodiments, but may be otherwise embodied.

In the illustrated embodiments, the above-described output characteristic setting means 76 is configured to set the output characteristic in each of the drive states, which is represented by a primary function relationship between the accelerator pedal operation amount θacc and the target vehicle drive force T*, as indicated in FIGS. 8-10 as the output characteristic map used for determining the vehicle drive force T* corresponding to the accelerator pedal operation amount θacc. However, the output characteristic setting means 76 is not limited to this configuration. For instance, various other relationships such as secondary function relationships between the accelerator pedal operation amount θacc and the target vehicle drive force T* may be used as the output characteristic maps for determining the target vehicle drive force T* corresponding to the accelerator pedal operation amount θacc.

In the illustrated embodiments, the above-described output characteristic setting means 76 is configured to smoothly change the target vehicle drive force T*, for preventing an abrupt change of the vehicle drive force (abrupt acceleration or deceleration of the vehicle), as a result of changing of the output characteristic due to a change of the drive state of the above-described hybrid vehicle 10. However, predetermined transient output characteristics may be used for preventing the above-indicated abrupt change. It is preferable to use different transient output characteristics consisting of: (a) an output characteristic used upon changing of the drive state from the above-described first drive state to the above-described second drive state, (b) an output characteristic used upon changing of the drive state from the second drive state to the third drive state, (c) an output characteristic used upon changing of the drive state from the third drive state to the second drive state, and (d) an output characteristic used upon changing of the drive state from the second drive state to the first drive state. Further preferably, a plurality of different sets of the above-described transient output characteristics (a)-(d) are used for the respective different drive modes of the above-described hybrid vehicle 10.

In the illustrated embodiments, the above-described hybrid vehicle 10 is selectively placed in one of the economy drive mode for economical running of the hybrid vehicle 10, the normal drive mode for ordinary running of the hybrid vehicle 10, and the sporty drive mode for running the hybrid vehicle 10 with a high degree of drivability. However, other drive modes may be provided in addition to or in place of those drive modes. The other drive modes may include a power drive mode selected for uphill running of the hybrid vehicle 10 with a large drive force, and a snow drive mode selected for running the hybrid vehicle 10 on snow-covered or frozen roadways. In this case, the above-described output characteristic setting means 76 is preferably configured to set different output characteristics for determining the target vehicle drive force T* corresponding to the accelerator pedal operation amount θacc, in the respective different drive modes.

It is to be understood that the present invention may be embodied with various other changes not described herein, which may occur to those skilled in the art, without departing from the spirit and scope of the invention.

NOMENCLATURE OF REFERENCE SIGNS

| | | | |
|---|---|---|---|
| 10: Hybrid vehicle | 12: Engine | 14: Crankshaft | 16: Intermediate shaft |
| 18: Input shaft | 20: Automatic transmission | | |
| 22: Forward-reverse switching device | 24: Output shaft | 25: First gear | |
| 26: Starting clutch | 28: Second gear | 30: Counter shaft | 32: Third gear |
| 34: Fourth gear | 36: Differential gear device | 38L, 38R: Axles | |
| 40L, 40R: Front drive wheels | 42: Planetary gear set | 44: Steering wheel | |
| 50: Electronic control device | 52: Accelerator pedal operation amount sensor | | |
| 54: Vehicle speed sensor | 56: Mode selector switch | 58: SOC sensor | |
| 60: Electric-energy storage device | 62: Engine output control device | | |
| 64: Hydraulic control device | 68: Memory device | | |
| 70: Hybrid drive control means | 72: Running mode determining means | | |
| 74: Drive state determining means | | | |
| 76: Output characteristic setting means | | | |
| 100, 150, 160: Hybrid drive system | | | |
| 102: Starter motor (First electric motor) | 104: Automatic transmission | | |
| 106: Input shaft | 108: Starting clutch | 110: Output shaft | |
| 120: Rear wheel drive device | 122: Fifth gear | 124: Sixth gear | |
| 126: Differential gear device | 128L, 128R: Axles | | |
| 130L, 130R: Rear drive wheels | 152: First clutch | 154: Second clutch | |
| 156: Output gear | 162: Planetary gear set | 164: Output gear | |
| 166: First clutch | 168: Second clutch | 170: Brake | |
| B1: Reverse drive brake | C1: Forward drive clutch | | |
| MG1: First motor/generator (First electric motor) | | | |
| MG2: Second motor/generator (Second electric motor) | | | |
| RMG: Rear drive motor/generator (Second electric motor) | | | |

The invention claimed is:

1. A control apparatus for a hybrid vehicle comprising:
an engine;
a first electric motor connected to the engine;
a second electric motor connected to wheels of the hybrid vehicle;
an electric-energy storage device for supplying an electric energy to the first and second electric motors;
a clutch interposed between the engine and the wheels and configured to selectively place a power transmitting path therebetween in a power transmitting state and a power cut-off state; and a controller that controls a running state of the hybrid vehicle;

wherein the controller selectively establishes one of:

a first drive state in which a vehicle drive force is generated primarily by the second electric motor operated with the electric energy supplied from the electric-energy storage device while the engine is placed in a rest state, and a second drive state in which the power transmitting path between the engine and the wheels is placed in the power cut-off state by the clutch while the first electric motor is operated with a drive force of the engine to generate an electric energy and in which the vehicle drive force is generated primarily by the second electric motor operated with at least one of the electric energy generated by the first electric motor and the electric energy supplied from the electric storage device; and the controller controls the hybrid vehicle such that the vehicle drive force generated in the second drive state at a given value of an operation amount of an accelerator pedal is larger than that generated in the first drive state.

2. The control apparatus according to claim 1, wherein the controller is configured to selectively establish one of the first drive state, the second drive state, and a third drive state in which the vehicle drive force is generated by the engine and the first electric motor operated with the electric energy supplied from the electric-energy storage device, and control the hybrid vehicle such that the vehicle drive force generated in the third drive state at a given value of the operation amount of the accelerator pedal is equal to that generated in the second drive state.

3. The control apparatus according to claim 1, wherein the controller is configured to selectively establish one of the first drive state, the second drive state, and a third drive state in which the vehicle drive force is generated by the engine and the first electric motor operated with the electric energy supplied from the electric-energy storage device, and control the hybrid vehicle such that the vehicle drive force generated in the third drive state at a given value of the operation amount of the accelerator pedal is larger than that generated in the second drive state.

4. The control apparatus according to claim 1, wherein the controller is configured to selectively establish one of an economy drive mode, a normal drive mode and a sporty drive mode, according to an operation of a manually operable member by an operator of the hybrid vehicle, and control the hybrid vehicle such that the vehicle drive force generated in the normal drive mode at a given value of the operation amount of the accelerator pedal is larger than that generated in the economy drive mode, and such that the vehicle drive force generated in the sporty drive mode at a given value of the operation amount of the accelerator pedal is larger than that generated in the normal drive mode.

5. The control apparatus according to claim 4, wherein the controller is configured to set an output characteristic of the hybrid vehicle, and wherein when the drive mode is changed from the presently established one of the economy, normal and sporty drive modes to another according to the operation of the manually operable member by the operator of the hybrid vehicle, the controller changes the output characteristic of the hybrid vehicle corresponding to the value of the operation amount of the accelerator pedal when the operation amount of the accelerator pedal has been reduced to or below a predetermined value.

* * * * *